Patented May 27, 1930

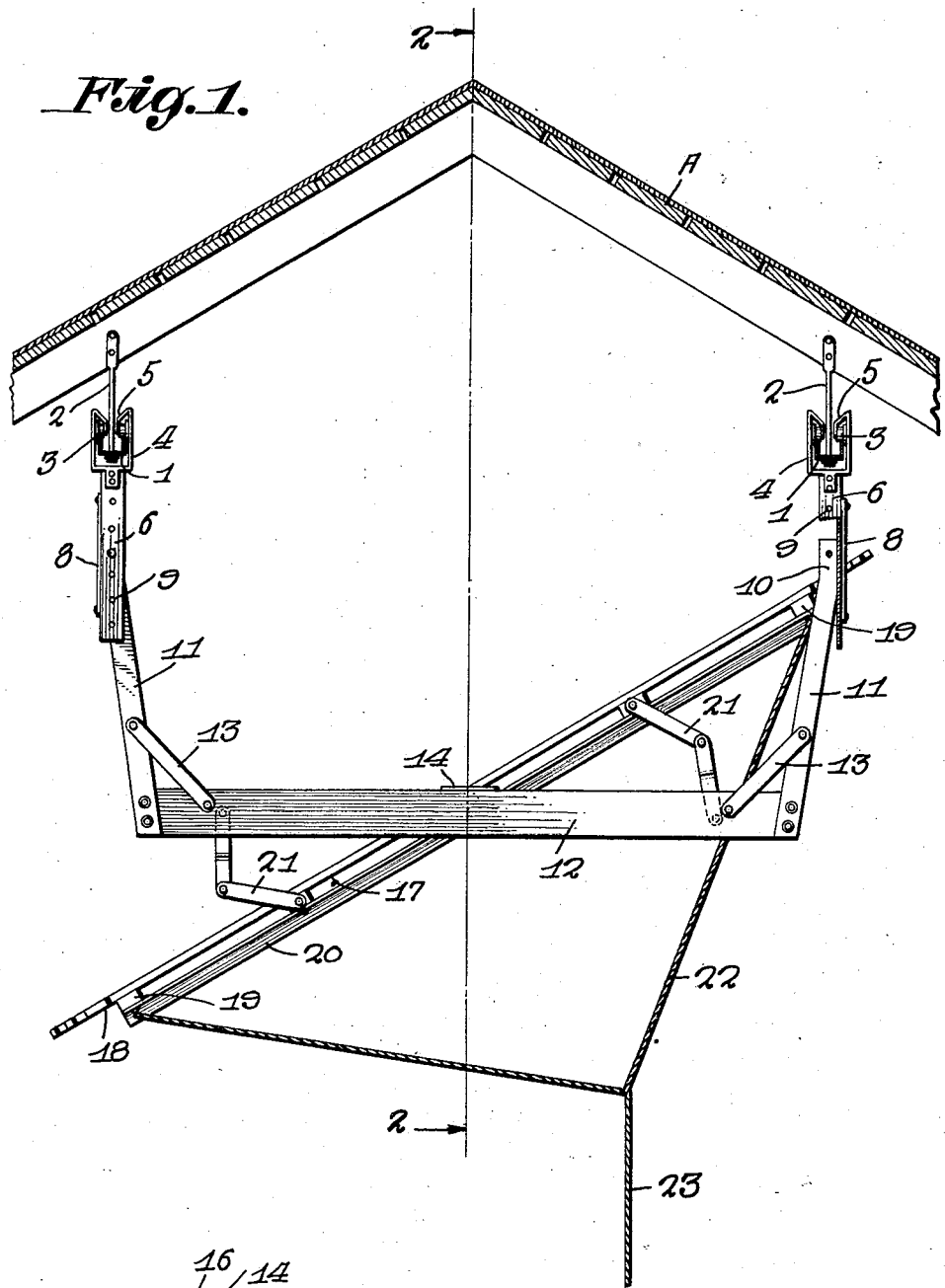

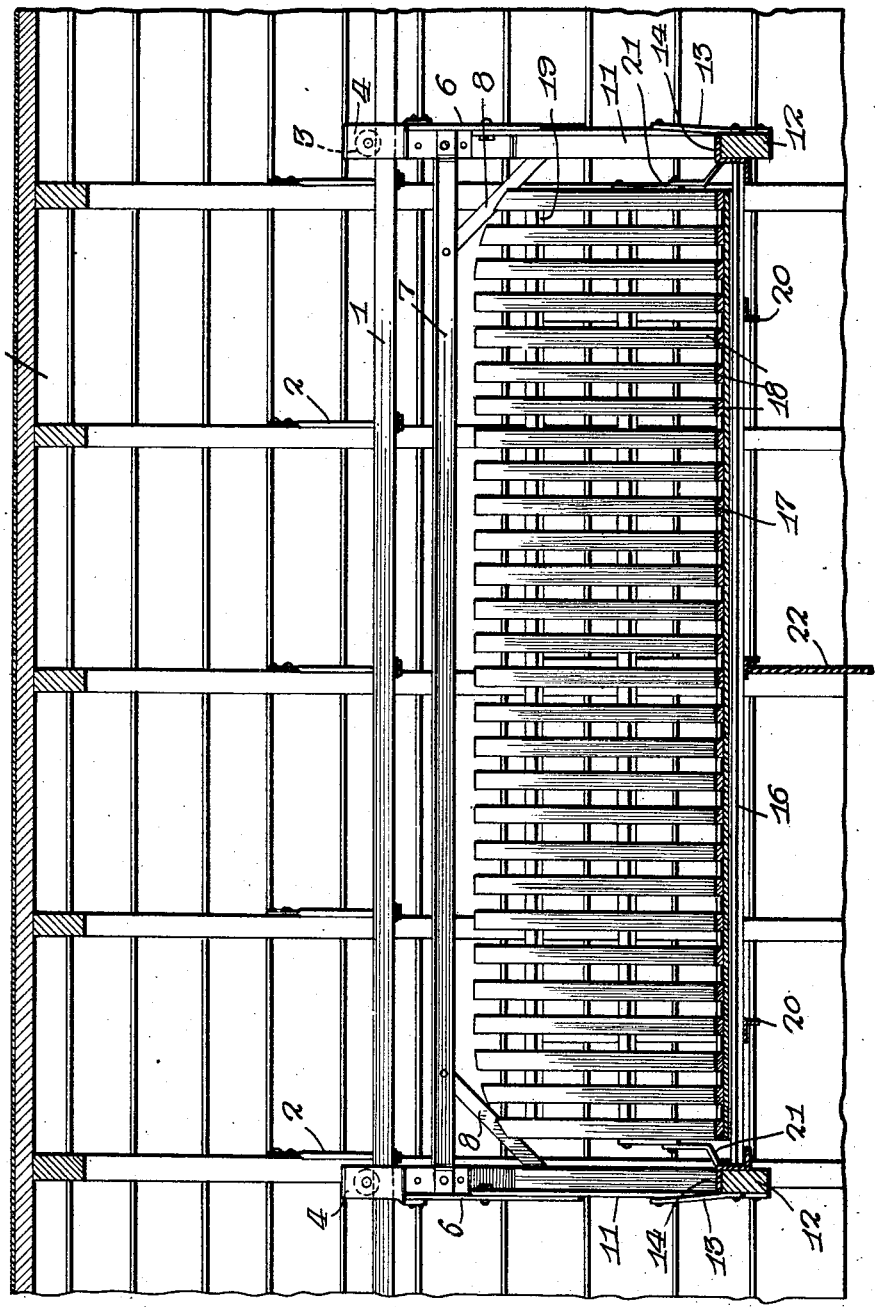

1,760,698

UNITED STATES PATENT OFFICE

CHARLES HOTH, OF POSTVILLE, IOWA

HAY MOWER

Application filed September 24, 1928. Serial No. 308,065.

This invention relates to hay delivery and distributing devices, and its general object is to provide an improved device of this character that cooperates with the usual traveling hay fork, for storing hay and the like in buildings, so that hay or the like can be moved in a building in an easy and expeditious manner, with minimum workmen and effort, the device guiding the hay where wanted, after the same leaves the fork, therefore, the confining of workmen for distributing the hay in the building is eliminated.

A further object of the invention is to provide an improved device of the character set forth, that is simple in construction, inexpensive to manufacture and install in any barn, hayloft or the like and is extremely efficient in operation and service in performing its intended function.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a sectional view taken through a portion of a building and showing my improved device installed therein.

Figure 2 is a sectional view taken approximately on line 2—2 of Figure 1, looking in the direction of the arrows.

Figure 3 is a view illustrating one of the saddles with the rock shaft that is supported therein in section.

Referring to the drawings in detail, the letter A indicates a fragmentary portion of a building which is shown for the purpose of illustrating the application of my present invention.

The device includes a pair of spaced parallel track-ways which are made up of channel iron strips 1 having their parallel portions disposed upwardly for a purpose which will be presently apparent and the strips 1 are secured in the building through the instrumentality of supporting rods 2 having their upper ends flattened and apertured to receive securing means for fixing the rods to the rafters as shown. The strips are secured to the lower ends of the rods in any well known manner by nuts as shown or cotter pins as will be apparent but in any event the rods are secured to the strips centrally of the side edges thereof so that the parallel portions each provide tracks to accommodate flanged rollers 3 arranged in cooperating pairs and carried by roller housings 4 that include substantially U-shaped body portions with inwardly and downwardly disposed arms 5 to which as well as to the sides of the housings are journaled the rollers as suggested in Figure 2 of the drawings.

Secured to the roller housings 3 and depending therefrom are angle strips 6 which have the ends of longitudinally disposed angle members 7 secured thereto, while braces 8 have their ends secured to the angle strips and angle members respectively as shown in Figure 2. The angle members secure two of the roller housings in parallel cooperative alignment with each other whereby the rollers of these last mentioned housings are mounted for movement on the same trackway.

The angle strips 6 are provided with a plurality of openings 9 arranged in a vertical row for the purpose of receiving securing means for adjustably securing the angle bent upper ends 10 of converging strips 11. In other words, the strips 11 converge toward each other to provide cooperating pairs which have secured to their lower ends transverse members 12, and these transverse members 12 have secured thereto one of the ends of braces 13, while the opposite ends of these braces 13 are fixed to the strips 11 as clearly shown in Figure 1 of the drawings.

The elements above described make up a substantially rectangular travelling frame, and fixed to the transverse members 12 midway their ends are saddles 14.

The saddles 14 are substantially L-shape in cross section and include a substantially V-shape portion 15 disposed inwardly from the transverse members 12, whereby the V-shaped portions 15 of each saddle cooperate with each other for the purpose of accommodating the ends of a rock shaft 16 which is square in cross section as clearly shown in Figure 3 of the drawings so that the flat sides of the rock shaft 16 engage the converging faces of the portions 15 and have a tendency to hold the platform in its adjusted positions. The rock shaft 16 is secured midway the ends of a cradle or platform 17 which includes a plurality of slats 18 secured in spaced parallel equi-distant relation with respect to each other and to cross bars 19 which have fixed thereto angle strips 20 bridging the cross bars as suggested in Figure 2 of the drawings.

By this construction, it will be apparent that the platform is mounted for rocking movement in the frame, and this movement is limited through the instrumentality of pairs of links 21. The links of each pair are pivotally secured together at one of their ends, while one of the links of each pair is pivotally secured to the ends of the innermost cross bars 19, while the opposite ends of the other link of each pair is pivotally secured to the transverse members 12. While these links limit the movement of the platform in its rocking movement, upon opposite sides of the rock shaft thereof, they in no way interfere with this movement, with the result the platform may be moved to either of its inclined positions, one of which is illustrated in Figure 1 in an easy and expeditious manner. This movement is brought about however by a flexible element such as a cable 22 which is disposed in normal V-shaped formation as shown, and secured to the apex of this cable 22 is a hand cable 23. The ends of the cable 22 is fixed to the middle angle strip 20. By employing the V-shaped portions 15 for the saddles 14, with the square in cross section rock shaft 16 disposed therein, as shown in Figure 3, the platform will have a tendency to be held in either of its inclined positions. If it becomes necessary, the platform can be secured in its respective positions by holding or fixing the lower end of the hand cable 23, however, it is never used in a horizontal position.

From the above description and disclosure of the drawings, it will be obvious that I have provided an improved device for delivering and distributing hay and the like in buildings, and the device is adapted to be used in combination with the usual travelling fork which when loaded and released will drop its load upon the platform so as to guide the hay or the like to the portion of the building desired, as the hay or the like when dropped upon the platform will slide therefrom. The adjustability of the converging strips 11 with the angle strips 6 makes it possible to adjust the frame to fit various sizes of buildings as well as for positioning the frame in accordance with the various shapes of buildings and with respect to the distances between the loft and other parts of the building. The angle strips and the converging strips 11 in reality provide corner posts for the frame which as previously set forth is substantially of rectangular shape in formation, but of course it can be of any desired shape or length without departing from the spirit of the invention providing it performs its intended function.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A delivery and distributing device comprising a wheeled adjustable frame, suspended tracks for the wheels of said frame, a platform, a rock shaft square in cross section and secured midway the ends of said platform, saddles secured to said frame, V-shaped portions included in said saddles and receiving the ends of said rock shaft, links pivotally secured in pairs and having their ends secured to the frame and platform respectively, bracing means for said frame, a flexible member having its ends secured to said platform, and a flexible element secured to the first mentioned flexible element for moving the latter to operate the frame and platform as well as for securing the platform at various positions with respect to said frame.

2. A delivery and distributing device comprising a wheeled frame, trackways for accommodating the wheels of said frame, adjustable corner posts for said frame, a platform, means for normally holding the platform at various positions with respect to said frame, said means including saddles having converging faces and secured to the frame, a square cornered in cross section rock shaft secured to the platform and having its ends mounted for rocking movement on the converging faces of the saddles, means for limiting the rocking movement of said platform and means for rocking the same.

In testimony whereof I affix my signature.

CHARLES HOTH.